United States Patent [19]

Kaplan

[11] Patent Number: 5,023,995
[45] Date of Patent: Jun. 18, 1991

[54] CABLE STRIPPING DEVICE
[75] Inventor: Steve E. Kaplan, Elyria, Ohio
[73] Assignee: Multilink, Inc., Elyria, Ohio
[21] Appl. No.: 488,119
[22] Filed: Mar. 5, 1990
[51] Int. Cl.⁵ .......................... B21F 13/00; H02G 1/12
[52] U.S. Cl. .......................................... 30/90.1; 81/9.4
[58] Field of Search ...................... 30/90.1, 90.6, 91.1; 81/9.4, 9.44

[56] References Cited

U.S. PATENT DOCUMENTS

| | | | |
|---|---|---|---|
| 4,345,375 | 8/1982 | Hayward | 30/90.1 |
| 4,459,881 | 7/1984 | Hughes, Jr. | 30/90.1 |
| 4,594,029 | 6/1986 | Michael | 30/90.1 |
| 4,599,794 | 7/1986 | Moriyama | 30/90.1 |
| 4,729,268 | 3/1988 | Morrow | 81/9.4 |

Primary Examiner—Douglas D. Watts
Assistant Examiner—Paul M. Heyrana, Sr.

[57] ABSTRACT

A cable stripping tool comprises a coring blade having dual coring edges on its leading end and a respective helical groove for each edge for leading cored plastic material away from the end of a cable as the cable is being stripped of plastic dielectric material to expose the center conductor, and an angled chamfering cutter for chamfering and cutting back the metal sheath which surrounds the dielectric material, the helical groove means of the blade extending to the rearward end of the blade to open into a relief space in the inner end portion of the tool holder.

23 Claims, 2 Drawing Sheets

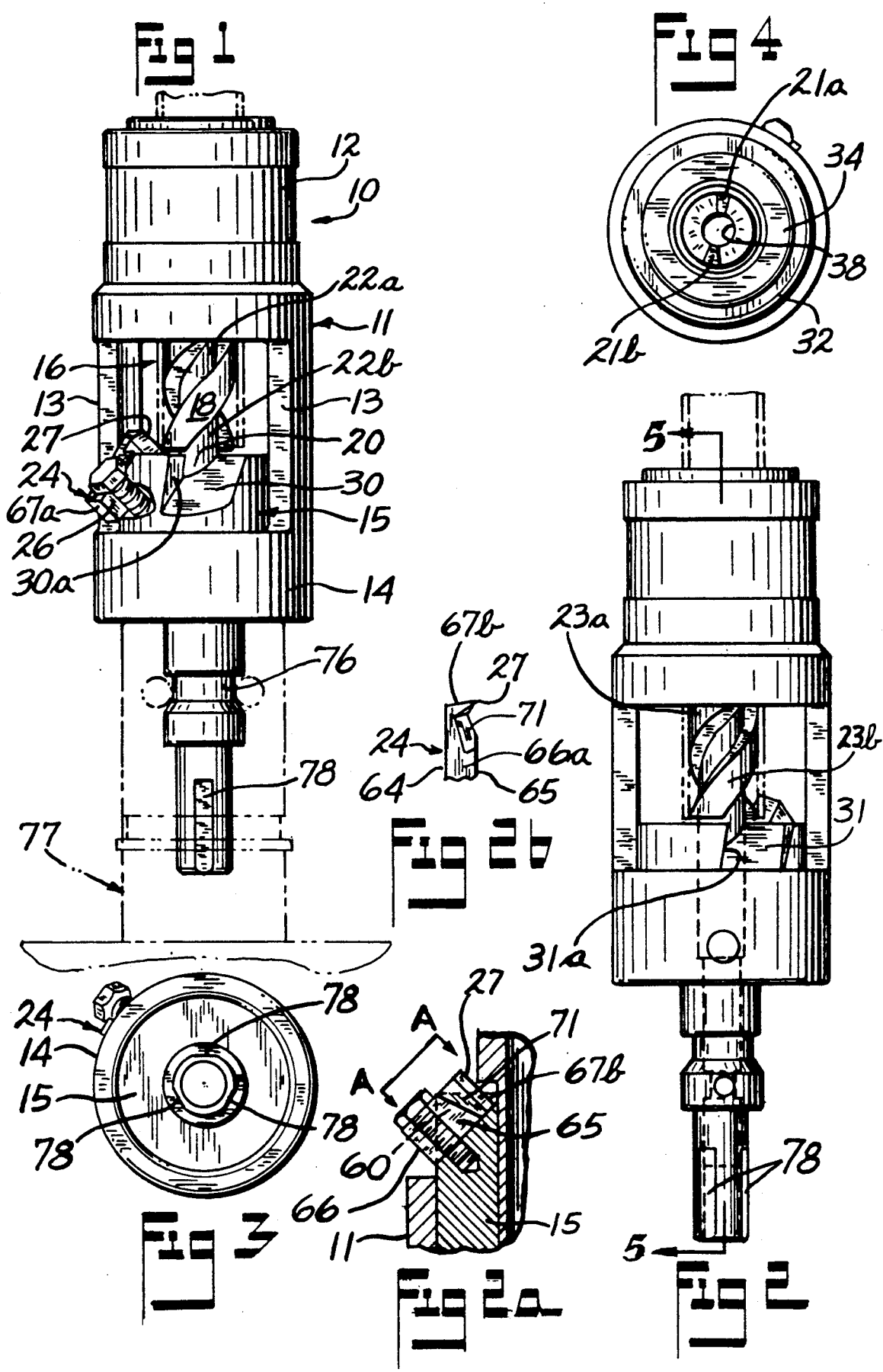

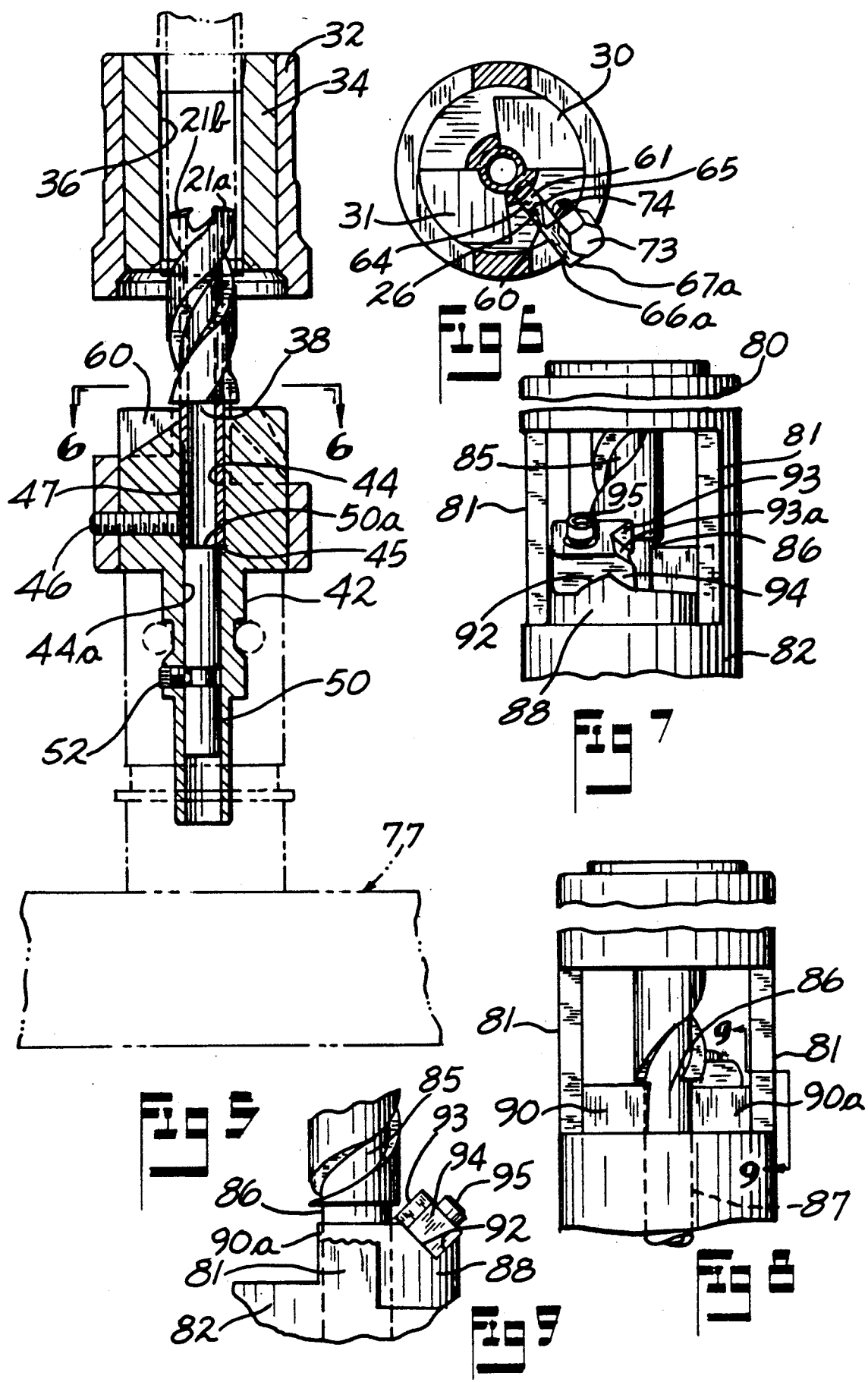

CABLE STRIPPING DEVICE

The present invention relates to cable stripping tools for stripping cables having a center conductor supported coaxially within a sheath by dielectric material surrounding the conductor and filling the space between the conductor and the sheath, and more particularly to a stripping tool for such cables used in connection with delivering cable television signals. Such cables have the center conductor disposed within and coaxially with a tubular thin metal sheath with the conductor being surrounded by and spaced from the inside walls of the sheath by dielectric plastic material, either a solid or foam type. The outside of the sheath is conventionally coated with a thin plastic coating, e.g. a coating of polypropylene.

BACKGROUND OF INVENTION

Cable stripping tools for such cables conventionally have a coring blade which is rotated to core the dielectric from between the center conductor and the sheath at the end to be stripped and a severing cutter to cut the sheath at the cored end of the cable to leave the center conductor protruding as a stinger for making a connection between the cable and a terminal or other junction.

While conventional stripping devices use a coring blade having a coring edge and a groove extending rearwardly of the blade away from the coring edge to lead the cored dielectric from the edge, the conventional devices do not operate well to guide the cored material away from the edge and out of the grooves so as to clear the cored material from the coring blade. Conventionally the grooves of the coring blades are constructed to have the cored material discharged therefrom intermediate the coring edge and the severing cutter. Such constructions have introduced undesirable resistance to the movement of the cored material away from the edges. Moreover the stripping tools have not been of such a construction that the end of the sheath being stripped is chamfered during the stripping operation as it is cut back to provide a protruding center conductor on the stripped end of the cable.

SUMMARY OF THE INVENTION

It is an object of the present invention to provide cable stripping devices of the type described in which the tool mounting body is so constructed and arranged that sheath cutting means for stripping back the sheath can be mounted in a position to chamfer and strip back the end of the sheath as it is cored to provide a smooth sheath end with a protruding center conductor.

It is another object of the present invention to provide a cable stripping device as in the preceding object in which the tool mounting body has a recessed area at the rearward end of a coring blade having a groove for leading cored dielectric material to the rearward end of the blade and into the recessed area, the recessed area preferably providing a guide wall which extends from a position along the shank of the coring tool outwardly from that position in the approximate direction of the movement of the cored dielectric from the groove to the wall.

It is still further an obJect of the present invention to provide cable stripping devices of the type described in which the cored dielectric has a relatively free path of movement in the relief grooves of the coring blades and is discharged at the end of a groove adjacent or below the severing cutter into a recessed space of the tool mounting member for the coring blade with the mounting member having a wall extending in the path of the cored material to be, or being, discharged from the groove end, the wall extending in the general direction of the movement of the cored material to the recessed area to minimize the interference with the flow of the cored material.

The present invention provides a cable stripping tool which has a severing cutter at the end of a coring blade for coring the dielectric of the cable, the cutter being mounted to have its severing edge angled, or canted, from the shank of the blade outwardly to chamfer and cut back the metal sheath which surrounds the dielectric material coaxially with the center conductor of the cable to be stripped to cause the end portion of the center conductor to extend beyond the end of the sheath, whereby the sheath end of the cable is cut back during coring to provide a smooth sheath end and a "stinger" for use in connecting the cable to terminals, junctions and the like.

Further, in accordance with other aspects of the present invention, the cable stripping tool comprises a coring bit comprising a coring blade having helical groove means, preferably two helical grooves, for leading cored plastic material away from the end of a cable, as the cable is being stripped of plastic dielectric material to expose the center signal carrying conductor, and an angled, or canted, severing cutter for chamfering and cutting back the metal sheath which surrounds the dielectric material coaxially with the center conductor to cause the end portion of the center conductor to extend beyond the end of the sheath to thereby provide a "stinger" for use in connecting the cable to terminals, junctions, and the like, the helical groove means extending to the rearward end of the blade to open into a relief space in the outer end portion of the tool holder, said relief space in the tool holder, extending from the end of a blade in the holder to below a severing cutter mounted on the tool holder, and a guide wall forming a wall of the relief space and extending along and transversely of the tool axis positioned across the path of cored particles from the blade groove for blocking movement of particles past the wall and guiding the particles into the relief space, the guide wall extending transversely of the tool holder axis and having its inner end positioned inwardly to at least about the radius the bottom of the groove of the blade to lie along the shank of the blade in the tool holder and extending outwardly from the shank in the general direction of movement toward the wall of the cored particles during a stripping operation.

DESCRIPTION OF DRAWINGS

In the drawings which constitute a part of this specfication for all subject matter disclosed or shown therein, FIG. 1 is an front elevational view of a cable stripping device embodying the present invention with the device rotated to the left from a straight front view;

FIG. 2 is a back elevational view of the device of FIG. 1;

FIG. 2a is a fragmentary sectional taken along line 2a—2a of FIG. 1;

FIG. 2b is a fragmentary detached view of the cutter shown in FIG. 1;

FIG. 3 is a bottom plan view of the device shown in FIG. 1;

FIG. 4 is a top plan view of the device as shown in FIG. 2;

FIG. 5 is a longitudinal sectional of taken along line 5—5 of FIG. 2;

FIG. 6 is a sectional view taken along line 6—6 of FIG. 5;

FIG. 7 is a fragmentary front elevational view of a modified stripping device embodying the present invention;

FIG. 8 is a back elevational view of the device of FIG. 7; and

FIG. 9 is a fragmentary view with portions cut-away looking from line 9—9 of FIG. 8.

DESCRIPTION OF PREFERRED EMBODIMENTS

A cable stripping device 10, in accordance with the present invention, comprises a cylindrical housing 11 having an outer (or forward) housing portion 12 for receiving a cable to be stripped and a tool holding main body 15 within a rear housing portion 14 spaced from the forward portion 12 by standards 13. The main body 15 mounts a cable coring tool 16 comprising a blade 18 having a shank 20, as well as a chamfering means 24 comprising an angled cutter 26 with an angled severing edge 27 for chamfering and cutting back the end of the cable being stripped to provide a stripped cable end with the center conductor of the cable extending outwardly of the sheath for purposes of making a connection at a junction, terminal, or the like. The housing and main body are rotatable about the stripping tool axis as a unit to effect a stripping of a cable.

The main body 15 has an axial passageway therethrough for receiving the shank 20 of the coring blade 18. The coring blade extends from adjacent the inner end of the main body coaxially with the housing to position its lead end at the inner side of the cable receiving portion 12 of the housing. The blade has a cylindrical outside surface and dual coring, edges 21a, 21b protruding outwardly from the lead end of the blade for coring the dielectric material of the cable and two helical grooves 22a 22b defining lands 23a and 23b between the grooves. The bottom of the grooves have essentially the same diameter as the shank 20, which may be termed the minor diameter of the coring blade.

Each coring edge is a conventional coring edge and is formed at the end of a land outwardly of the forward end of a respective one of the helical grooves 21a, 21b. During a stripping operation, the grooves relieve the coring edges of the cored dielectric material which will travel rearwardly in the helical grooves 22a, 22b to the end of the grooves as coring continues. Each groove extends at full depth, without interruption and without relief of the cored material, for the full length of the blade to discharge the cored material at the rearward, or bottom, end of the blade located at the inner end of the main body 15.

The grooves 22a, 22b open at their rearward ends to recessed areas in the main body which extend rearwardly and outwardly from the inner end of the main body along the shank of the blade. The recesses have sloped bottoms or floors 30,31 at the open ends of each groove so as to provide chute-like recesses into which the helical grooves 22a, 22b respectively open. The recessed areas have, adjacent each of the sloped floors 30, 31, a respective side wall 30a, 31a. The walls extend inwardly of the main body to the opening therein for the shank 20 of the blade 18 so that the inner ends of the wall lie along the blade shank which is essentially of the same diameter as the bottom of the grooves in the blade. The chute-like recesses in effect form an extension of the grooves to guide the corings downwardly and outwardly away from the coring blade 18 and the cutter 26 to guide the cored material beyond the end of the blade 18.

Referring to FIG. 5, the forward portion 12 of the housing 11 comprises a cylindrical wall 32 defining an opening for a removable sizing bushing 34 having an axial cable receiving opening 36 extending therethrough. The opening 36 has a diameter slightly larger than the cable so as to receive the cable to be stripped and the diameter may be oversized so as to be operable with a limited range of different size cables. The cable to be stripped is inserted into the opening and pressed against the lead end of the coring blade 18 which extends a short distance into the opening 36 from its bottom end. The outside diameter of the blade 18 is slightly less than the inside diameter of the sheath of the cable to allow the sheath to telescope over the blade during a stripping operation. The dielectric material is cored by turning the tool housing and the blade while holding the cable against rotation, as is conventional. As in conventional stripping devices, as the dielectric is cored, the sheath will telescope over the blade and the center conductor will enter a circular passageway 38 extending coaxially through the blade 18 and its shank. The passageway 38 is slightly larger in diameter than the diameter of the center conductor of the cable so as to allow the center conductor to move axially of the passageway as the dielectric is cored, as in conventional cable stripping tools.

As is shown in FIG. 5, the main body 15 has a reduced cylindrical portion 42 extending axially from the rearward end thereof. A passageway 44 for receiving the shank of the blade extends axially through the main body but with a reduced diameter in the rearward extending portion 42 of the main body. The reduced diameter of the passageway 44 provides a stop 45 in the main body for the shank of the coring blade to properly position the blade length in the stripping device. The reduced portion of the passageway has been given the reference number 44a. While the passageway portion 44a is of reduced diameter, the diameter preferably remains such that the passageway will pass the stripped center conductor.

In the illustrated embodiment, a set screw 46 threads radially through the base 14 of the housing and the main body to engage a flat 47 on the shank 20 of the coring blade to fix the coring device in the holder. The flat is in a position angularly on the shank 20 to enable the setting of the bottom ends of the grooves 22a, 22b in proper position relative to the recessed relief areas in the main body. While, preferably, the set screw would only set properly in one position of angular orientation, the connection does not have to uniquely provide one position of angular orientation as long as there is an angular position such that the bottom of the grooves open properly with respect to the recessed areas.

In the preferred embodiment, a stop member 50 is inserted into reduced passageway 44a and the inner end thereof provides a stop 50a for the central conductor at a predetermined depth for the conductor in the main body. In the illustrated embodiment, the stop is positioned at the shoulder 45 for the end of the shank of the tool and is held in position axially by a set screw 52 which threads through a portion 42a, which is a further reduction of the portion 42 of the main body at a distance from the shoulder 45 to be received in an annular groove 54 in the stop member 50 to fix the stop member against axial movement in the reduced passageway 44a. It can be seen that by shortening the length of the stop member from the set screw groove to the end of the stop member which provides the stop for the center conductor, the stop member will allow a greater length of cable to be stripped. For example, this may be done in the illustrated embodiment by reversing the stop member end for end since the annular groove on the stop member which receives the set screw is displaced from the mid-length of the stop member toward one end of the member.

As a cable is stripped, the sheath and center conductor first move the length of the blade 18 to be adjacent the sheath stripping means 24. Then the center conductor will, with continued coring, proceed into the shank of the coring blade, However, the sheath stripping means will begin chamfering and cutting back the sheath when the center conductor and sheath reach the end of the blade 18. The sheath will be cut back with a chamfered edge a distance corresponding to the depth that the center conductor moves into the shank and main body.

In accordance with the present invention cutter 16 for the sheath is preferably of a flat rectangular shape and is mounted in a generally rectangular cutter slot 58 in the main body which is at its inner end is open to the shank passageway 44 for the tool shank below the inner end of the blade of the tool device. The cutter slot has side walls 60,61 which engage opposing major faces 64,65 of the cutter 26, the cutter having narrow longitudinal side walls 66a, 66b and end walls 67a, 67b extending between the opposing side faces 64,65. The end wall 67b is undercut inwardly from the major face 65 beginning adjacent their corner line to provide the severing edge 27 which lies essentially along the corner line with the underside of the severing edge tapering inwardly of the cutter to form one wall of a relief cutout 71 for the severing edge, the cutout extending transverserly of the major face 65 between the longitudinal sidewalls of the cutter.

The bottom of the cutter slot in the outer end of the tool holder is inclined upwardly, or forwardly, toward of the axis of the stripping tool from the outer periphery of the tool holder approximately along a diametral plane of the holder so that the severing edge of the cutter is angled inwardly and rearwardly toward the tool shank to cross the end of the sheath at a chamfering angle which positions the outer end of the severing edge outwardly and forwardly of the rear end of the blade and the inner end is positioned inwardly of the outer diameter of the blade adjacent the shank of the coring tool just rearwardly of the blade end.

The cutter is clampable against the bottom of the cutter slot by the head 73 of a clamp bolt 74 which threads into the main body 15 adjacent the cutter slot and the cutter can be adjusted along the slot be releasing the clamping bolt.

The rearwardly extending reduced portion of the main body has an annular groove 76 with a rearwardly sloping rear wall for use in connecting a quick disconnect racheting handle 77 for rotating the stripping device to strip a cable end, the handle having a ball type quick connect coupling on its stem. The handle is conventional and is shown in phantom in FIGS. 1 and 5.

The rearward end of the reduced portion 42a of the main body may also be provided with drive flats 78 to enable the stripping tool to be rotated with a hand or power driven socket or chuck not shown.

From the foregoing it can be seen that the cable is stripped by rotating the stripping tool with all parts moving as a unit in a fixed relationship with each other. The cable is inserted into the forward end of the tool and pressed against the lead end of the coring blade as the tool is rotated in the direction which causes the coring edges to work, which is the direction which the cutter severing edge 27 faces. As the dielectric material is cored, the material pushes rearwardly, in the helical grooves 22a, 22b to the end of the grooves at the tool holder and discharges from the grooves into recessed areas in the inner end face of the main body the tool holder. At the rearward end of each helical groove in the blade, the inner end of the main body tool holder is recessed to provide a wall which extends from the discharge end of the groove along the tool shank from the end of the trailing side of the groove in the direction of ratation of the tool to block corings being discharged from relatively moving past the wall as the tool is rotated and to guide them rearwardly and preferably outwardly of the holder.

Referring to FIGS. 7 & 8, the drawings illustrate a modified stripping tool having a housing which is essentially the same as the housing of the first described embodiment. However, the tool holding main body of the first described embodiment has been modified to illustrate a different sheath cutter mounting and sheath cutter, as well as to illustrate a tool mounting for use with a coring blade having a single coring edge on the coring blade and a single helical relief groove extending the length of the blade. In the modification, the stripping tool has a forward housing portion 80 spaced by diametrically opposed standards 81 from a base housing portion 82 with the forward and base housing portions corresponding to those the first embodiment. The coring tool utilized in the modified embodiment has a coring blade 84 utilizing a single coring edge (not shown) and a single helical groove 85 for relieving the cored dielectric from the coring edge. The blade has a shank 86 received in an axial passageway 87 extending through a main body 88 as in the first described embodiment. The inner end portion of the main body 88 is disposed in the base housing portion as in the first embodiment, and is stepped, front(as viewed in FIG. 7) to back to provide a recessed area at the end of the single helix groove for relieving the groove of the cored dielectric. The stepped construction provides essentially aligned transverse walls 90a, 90b rising from the bottom of the recessed area on the back side of the housing, the walls extending transversely from the outer pheriphery of the main body to intersect the shank opening so as to lie along the back side of the shank of the coring blade on either side of the end of the helix groove 85 with the wall 90a being in the path of cored particles moving to the front side of the housing and guiding the cored dielectric into the recessed area on the back side of the walls 90a, 90b. The wall 90a extends outwardly away from the shank of the tool so as to allow the cored particles to move from the end of the groove to the recessed area approximately in the direction of their relative movement from the bottom of the groove end at the wall.

The cutter mounting and the cutter also have been modified in the embodiment of FIGS. 7 & 8. The back wall 90a of the main body extends to the front around the shank passageway and the inner end face of the main body has a generally horizontal cutter support cutout or slot 92, as the holder is viewed in FIG. 7, in its front portion, the cutout having a tilted L-shape. The cutout shown has a back wall 92a slanting rearwardly and outwardly of the main body so as to tilt the severing edge 93 of a cutter 94 to extend at a chamfering angle across the end of the blade to sever the sheath as in the first described embodiment. The wall 92a extends outwardly and rearwardly to intersect a rearwardly and inwardly extending wall 92b which forms the front wall of the cutter receiving slot. The cutter cutout slot may provide a tilt from the outer end of the slot forwardly toward the severing edge of the cutter rather than extending perpendicularly skew to the axis of the main body.

As will be noted from FIG. 7, the severing edge extends essentially in an axial plane outwardly from the shank and at an acute chamfering angle with the axis toward the lead end of the blade and is located adjacent the end of a blade land portion, i.e., a portion of maximum blade diameter. The inner end portion of the main body member is also recessed between the cutter slot and the front side of wall 90b to provide clearance ahead of the cutter with the clearance area extending to the shank passageway in the main body.

The cutter 94 has a generally rectangular cutter body with one end 94a of the body being cut away to form the severing edge 93 and relief slot 93a therefor along a corner line of the cutter body. In this embodiment, the cutter is held in the cutter slot by a clamp bolt 95 which passes through the body of the cutter and threads into the bottom of the cutter slot. Preferably the opening in the cutter body for the clamp bolt is elongated lengthwise of the cutter slot to allow adjustment of the cutter along the cutter slot toward and away from the shank of a coring blade.

From the foregoing it can be seen that, in the illustrated embodiments the cable is stripped by rotating the stripping tool with all parts moving as a unit in a fixed relationship with each other. The cable is inserted into the forward end of the tool and pressed against the end of the coring blade as the tool is rotated in the direction which causes the coring edges to work, which is the same as the direction which the severing edge of the chamfering cutter faces. As the dielectric material is cored, the material pushes rearwardly, in the helical grooves 22a, 22b or the groove 85 to the end of the grooves at the tool holder and discharges into a recessed area in the end of the tool holder. At the lower end of each helical groove in the blade, the inner end of the tool holding member is recessed to provide a wall which extends from the discharge end of the groove along the tool shank from the end of the lead side of the groove, i.e., the leading side of the groove in the direction in which the cored materials are moving around the shank, to form a block in the path of material continuing around the shank and to allow movement in the same general direction in which the material is moving at the wall as well rearwardly and outwardly of the shank into the recessed area which extends outwardly of the main body from of the its passageway for the blade shank.

What I claim is:

1. In a stripping device which is rotated about an axis relative to a cable to strip an end of the cable, the cable having a center conductor and dielectric between the center conductor and an outside sheath, said device comprising a tool mounting member for separately and removably supporting a sheath severing cutter and a coring tool for coring dielectric material from the end of the cable with the outer sheath telescoping over the coring tool and the center conductor moving in a central passageway through the coring tool as the device is rotated to core dielectric material from the end of a cable with the coring tool comprising a coring blade section having an outside diameter to be received inside the sheath of the cable to core the dielectric of the cable and the coring blade section extending rearwardly from the forward end of the coring tool and terminating at its rearward end in a reduced portion providing a rearwardly extending shank of reduced diameter to be received in the tool mounting member for holding the coring tool in said tool mounting member, said tool mounting member having an axial passageway, approximately the diameter of the tool shank, which opens into the forward end of the tool mounting member for receiving the shank extending from the coring blade section to support the coring tool along the axis of the device with rearward end of the blade section disposed adjacent the forward end of the tool mounting member and the shank extending inwardly of the tool mounting member from the forward end of said axial passageway, said tool mounting member having cutter mounting means on its forward end for removably mounting a sheath severing cutter independently of said coring tool in a position adjacent the rearward end of the blade section of a coring tool mounted in said tool holding member with the severing edge of the cutter extending angularly at a chamfering angle across the path of a sheath moving from the end of said coring blade section, the severing edge extending to a position inwardly of the outside surface of the coring blade section of the coring tool to sever and chamfer the sheath as the coring action moves the sheath past the cutter.

2. In a stripping device as defined in claim 1 wherein the coring tool to be received in the tool mounting member has at least one coring relief groove extending substantially the length of the coring blade section and terminating in an open end at the rearward end of the blade section and in which the forward end of the tool mounting member of the stripping device has an individual recessed area corresponding to each groove adjacent said axial passageway in the tool holding member with the recessed area extending away from the forward end of the tool mounting member and being disposed in a location on the member such that the open end of the corresponding coring relief groove in the blade section opens to the recessed area.

3. In a stripping device as defined in claim 2 in which said recessed area has a wall for guiding corings from said groove into said recessed area in a direction approximate to the direction in which the corings are moving on leaving the open end of the groove.

4. In a stripping device as defined in claim 1 in which the tool mounting member has two recessed areas adjacent and spaced angularly about said axial passageway in the tool holding member for receiving corings from a respective coring relief groove extending longitudinally of said coring blade and terminating in an open end at the rear end of said coring blade section, each of the recessed areas extending rearwardly from the forward end of said tool mounting member to guide the coring rearwardly and outwardly away from the axis of the tool mounting member for directing corings rearwardly and outwardly of the tool mounting member.

5. In a stripping device as defined in claim 4 in which said recessed areas each has a wall extending transversely from said axial passageway outwardly from the axial passageway in a direction approximate to the direction in which cored dielectric is moving as it leaves the end of the corresponding groove.

6. In a stripping device as defined in claim 1 in which the cutter mounting means on said tool holding member comprises wall means for supporting and positioning a removable severing cutter in a sheath chamfering position, said wall means comprising a cutter support wall inclined outwardly and rearwardly away from the axial passageway of the tool holder to orient the severing edge of the cutter at a chamfering angle across the path of the sheath as it moves from the blade section of the coring tool.

7. In a stripping device as defined in claim 6 wherein the coring tool has at least one coring relief groove extending substantially the length of the coring blade section and terminating in an open end at the rearward end of the blade section and in which the forward end of the tool mounting member of the stripping device has an individual recessed area corresponding to each groove adjacent said axial passageway in the tool holding member with the recessed area extending away from the forward end of the tool mounting member and being disposed in a location on the member such that the open end of the corresponding coring relief groove in the blade section opens to the recessed area.

8. In a stripping device as defined in claim 7 in which each of said recessed areas has a wall extending transversely and outwardly from said axial passageway and in a direction approximate to the direction in which cored dielectric is moving as it leaves the end of the corresponding groove to guide the cored dielectric material away from the rearward end of the coring blade section of a coring tool mounted in the tool holding member.

9. In a cable stripping device as defined in claim 8 in which said tool mounting member has a continuation passageway communicating with the rearward end of said axial passageway, and means for selecting the length of cable to be stripped comprising means on said tool mounting member for securing a stop member in said continuation passageway to position an end thereof to engage the center conductor of the cable being stripped and stop the movement of the center conductor and cable through the stripping device upon the stripping of the selected length.

10. In a cable stripping device as defined in claim 9 in which said tool mounting member has a continuation passageway communicating with the rearward end of said axial passageway, and means for selecting the length of cable to be stripped comprising means on said tool mounting member for securing a stop member in said continuation passageway to position an end thereof to engage the center conductor of the cable being stripped to stop the movement of the center conductor and cable through the stripping device upon the stripping of the selected length.

11. In a stripping device as defined in claim 9 in which the tool mounting member has a recessed area adjacent the forward end of said axial passageway, the recessed area extending away from the rearward end of the coring blade section of the coring tool for guiding the corings from the rearward open end of a relief groove in the blade section for directing the and guiding the corings from the rearward end of the blade section, said recessed area having a wall extending to guide moving corings from said groove into said recessed area in a direction approximately that in which the corings are moving from the open end of the groove.

12. In a cable stripping device as defined in claim 8 in which said axial tool mounting member has a continuation passageway communicating with the rearward end of said axial passageway, and means for selecting the length of cable to be stripped comprising means on said tool mounting member for securing a stop member in said continuation passageway to position an end thereof to engage the center conductor of the cable being stripped to stop the movement of the center conductor and cable through the stripping device upon the stripping of the selected length.

13. In a stripping device as defined in claim 7 in which said cutter mounting means comprises means for releasably securing the severing cutter on said tool mounting member for adjustment along said wall means toward and away from a the end of said coring blade section to adjust the cutter along a line which maintains the chamfering angle of the severing edge relative to the blade section and sheath thereon.

14. In a stripping device as defined in claim 7 in which said wall means provides a cutter slot means inclined rearwardly and outwardly from the axis of the tool holding member, said slot means having comprising a bottom for supporting the cutter with the bottom extending from the adjacent the forward end of said axial passageway rearwardly and outwardly to the outer periphery of the tool holding member and said tool mounting member having two said individual recessed areas.

15. In a stripping device as defined in claim 6 in which the tool mounting member has two recessed areas adjacent and spaced angularly about said axial passageway in the tool holding member for receiving corings from a respective coring relief groove extending longitudinally of said coring blade and terminating in an open end at the rear end of said coring blade section, each of the recessed areas extending rearwardly from the forward end of said tool mounting member to guide the corings rearwardly and outwardly away from the axis of the tool mounting member for directing corings rearwardly and outwardly of the tool mounting member.

16. In a stripping device as defined in claim 15 in which said cutter mounting means comprises means for releasably securing the severing cutter on said tool mounting member means for adjustment along said wall means toward and away from a the end of said coring blade section to adjust the cutter along a line which maintains the chamfering angle of the severing edge relative to the blade section and sheath thereon.

17. In a stripping device as defined in claim 15 in which said wall means provides a cutter slot means inclined rearwardly and outwardly from the axis of the tool holding member, said slot means having comprising a bottom for supporting the cutter with the bottom extending from the adjacent the forward end of said axial passageway rearwardly and outwardly to the outer periphery of the tool holding member.

18. In a stripping device as defined in claim 6 in which said cutter mounting means comprises means for releasably securing the severing cutter in the cutter mounting means for adjustment along said wall means toward and away from a the end of said coring blade section to adjust the cutter along a line which maintains the chamfering angle of the severing edge relative to the blade section and sheath thereon.

19. In a stripping device as defined in 6 in which said wall of said wall means lies along a line essentially perpendicularly skew to said axis and in a plane inclined at an acute angle to the axis.

20. In a stripping device as defined in claim 6 in which said wall means provides a cutter slot means inclined rearwardly and outwardly from the axis of the tool holding member, said slot means having comprising a bottom for supporting the cutter with the bottom extending from the adjacent the forward end of said axial passageway rearwardly and outwardly toward the outer periphery of the tool holding member.

21. In a cable stripping device as defined in claim 6 in which said tool mounting member has a continuation passageway communicating with the rearward end of said axial passageway, and means for selecting the length of cable to be stripped comprising means on said tool mounting member for securing a stop member in said continuation passageway to position an end thereof to engage the center conductor of the cable being stripped and stop the movement of the center conductor and cable through the stripping device tool upon the stripping of the selected length.

22. In a cable stripping device as defined in claim 1 in which said tool mounting member has a continuation passageway communicating with the rearward end of said axial passageway, and means for selecting the length of cable to be stripped comprising means on said tool mounting member for securing a stop member in said continuation passageway to position an end thereof to engage the center conductor of the cable being stripped to stop the movement of the center conductor and cable through the stripping device upon the stripping of the selected length.

23. In a stripping device which is rotated about an axis relative to a cable to strip an end of the cable, the cable having a center conductor and dielectric between the center conductor and an outside sheath, said device comprising a tool mounting member for supporting a coring tool for coring dielectric material from the end of the cable with the outer sheath telescoping over the coring tool and the center conductor moving in a central passageway through the coring tool as the device is rotated to core dielectric material from the end of a cable, the coring tool comprising a coring blade section having an outside diameter to be received inside the sheath of the cable to core the dielectric of the cable with the coring blade section extending rearwardly from the forward end of the coring tool and terminating at its rearward end in a reduced portion providing a rearwardly extending shank of reduced diameter to be received in the tool mounting member for holding the coring tool in the member, said tool mounting member having an axial passageway, approximately the diameter of the tool shank, which opens into the forward end of the tool mounting member for receiving the shank extending from the coring blade section to support the coring tool along the axis of the device with the shank extending inwardly of the tool mounting member from the forward end of said axial passageway, said tool mounting member having cutter mounting means on its forward end for mounting a cutter independently of said coring tool immediately adjacent the rearward end of the blade section of a coring tool with the severing edge of the cutter extending to a position adjacent the outside surface of the coring blade section to sever the sheath of a cable being stripped as the coring action moves the sheath past the cutter, said cutter mounting means comprising wall means for fixing the orientation of the cutter relative to the coring blade section and means mounted on said tool mounting member for securing said cutter in a severing position and for adjustment relative to the tool mounting member and the coring blade section mounted therein.

* * * * *